US011746917B2

(12) United States Patent
Muzzo et al.

(10) Patent No.: US 11,746,917 B2
(45) Date of Patent: Sep. 5, 2023

(54) PRESSURE REGULATOR WITH OUTLET OVERPRESSURE SECURITY

(71) Applicant: Rotarex S.A., Lintgen (LU)

(72) Inventors: Paul Muzzo, Yutz (FR); Guillaume Massin, Heisdorf (LU); Philippe Schmitz, Steinsel (LU)

(73) Assignee: ROTAREX S.A., Lintgen (LU)

( * ) Notice: Subject to any disclaimer, the term of this patent is extended or adjusted under 35 U.S.C. 154(b) by 0 days.

(21) Appl. No.: 17/802,608

(22) PCT Filed: Feb. 23, 2021

(86) PCT No.: PCT/EP2021/054463
§ 371 (c)(1),
(2) Date: Aug. 26, 2022

(87) PCT Pub. No.: WO2021/170586
PCT Pub. Date: Sep. 2, 2021

(65) Prior Publication Data
US 2023/0167915 A1    Jun. 1, 2023

(30) Foreign Application Priority Data

Feb. 26, 2020 (LU) .................... LU101653

(51) Int. Cl.
*F16K 17/04* (2006.01)
*F16K 17/16* (2006.01)
(Continued)

(52) U.S. Cl.
CPC ............ *F16K 17/048* (2013.01); *F16K 17/16* (2013.01); *F17C 13/04* (2013.01);
(Continued)

(58) Field of Classification Search
CPC ........ F16K 17/048; F16K 17/16; F17C 13/04; F17C 2205/0332; F17C 2205/0338;
(Continued)

(56) References Cited

U.S. PATENT DOCUMENTS

| 1,659,263 A | * | 2/1928 | Harris ................ G05D 16/0663 |
| | | | 137/454.5 |
| 2,664,674 A | * | 1/1954 | Niesemann ........ G05D 16/0663 |
| | | | 137/454.2 |

(Continued)

FOREIGN PATENT DOCUMENTS

| EP | 3246781 A1 | 11/2017 |
| WO | 2017134014 A1 | 8/2017 |
| WO | 2018215159 A1 | 11/2018 |

OTHER PUBLICATIONS

International Search Report for PCT/EP2021/054463 dated Apr. 30, 2021.
Written Opinion for PCT/EP2021/054463 dated Apr. 30, 2021.

*Primary Examiner* — Minh Q Le
(74) *Attorney, Agent, or Firm* — Sandberg Phoenix & von Gontard PC

(57) ABSTRACT

A regulator for compressed gas, comprising a body with a gas inlet, a gas outlet and a gas passage fluidly interconnecting the gas inlet and gas outlet; a pressure reducer with, in the gas passage, a shut-off device and a movable assembly operatively connected to the shut-off device and delimiting with the body a regulating chamber downstream of the shut-off device; a pressure relief device in the gas passage downstream of the regulating chamber; and a flow restriction in the gas passage upstream of the shut-off device, dimensioned for reducing the gas pressure at the gas outlet under a maximum pressure value when the pressure relief device is opened and the shut-off device is opened.

15 Claims, 3 Drawing Sheets

(51) Int. Cl.
  *F17C 13/04* (2006.01)
  *G05D 16/06* (2006.01)
  *F23K 5/00* (2006.01)
(52) U.S. Cl.
  CPC .. *G05D 16/0658* (2013.01); *F17C 2205/0332* (2013.01); *F17C 2205/0338* (2013.01); *F23K 5/002* (2013.01); *F23K 2900/05001* (2013.01); *F23K 2900/05002* (2013.01); *F23N 2235/24* (2020.01)
(58) Field of Classification Search
  CPC ............... G05D 16/0658; F23K 5/002; F23K 2900/05001; F23K 2900/05002; F23N 2235/24
  USPC ...... 137/68.19, 118.06, 119.09, 505, 505.11, 137/505.12, 505.13, 505.21, 505.26, 137/505.37
  See application file for complete search history.

(56) References Cited

U.S. PATENT DOCUMENTS

| | | | | |
|---|---|---|---|---|
| 3,319,829 A * | 5/1967 | Sentz | ...................... | G05D 16/10 222/399 |
| 3,625,247 A * | 12/1971 | Dargatz | ............. | G05D 16/0655 137/505.11 |
| 3,990,470 A * | 11/1976 | Malec | .................. | G05D 7/0106 137/116.5 |
| 5,123,442 A | 6/1992 | Geuy et al. | | |
| 5,135,023 A | 8/1992 | Ross | | |
| 5,890,512 A * | 4/1999 | Gotthelf | .............. | G05D 16/0663 137/505.11 |
| 6,062,258 A * | 5/2000 | Diehl | .................. | G05D 16/0663 137/505.41 |
| 6,629,544 B2 * | 10/2003 | Nakajima | ........... | F02M 21/0233 251/64 |
| 8,851,107 B2 * | 10/2014 | Risse | .................. | G05D 16/0663 137/506 |
| 9,128,491 B2 * | 9/2015 | Kremer | .............. | G05D 16/0663 |
| 2005/0056338 A1 * | 3/2005 | Hertzler | ................... | F17C 13/04 141/2 |
| 2006/0231142 A1 * | 10/2006 | Schwartz | ................. | F17C 13/04 137/505.25 |
| 2009/0078321 A1 * | 3/2009 | Arnott | ................... | G05D 16/103 137/315.04 |
| 2009/0272443 A1 * | 11/2009 | Lee | .......................... | F16K 1/306 220/586 |
| 2011/0272040 A1 * | 11/2011 | Tai | ........................ | G05D 16/107 137/315.04 |
| 2017/0159610 A1 * | 6/2017 | Ehlig | ....................... | F16K 27/02 |
| 2018/0100596 A1 * | 4/2018 | Lee | .......................... | F16K 17/00 |
| 2019/0277496 A1 | 9/2019 | Hawkins | | |

* cited by examiner

PRESSURE REGULATOR WITH OUTLET OVERPRESSURE SECURITY

CROSS-REFERENCE TO RELATED APPLICATIONS

The present invention is the US national stage under 35 U.S.C. § 371 of International Application No. PCT/EP2021/054463 which was filed on Feb. 23, 2021, and which claims the priority of application LU101653 filed on Feb. 26, 2020 the contents of which (text, drawings and claims) are incorporated here by reference in its entirety.

FIELD

The invention is directed to the field of regulators for compressed gas, more particularly for regulators with a pressure reducer, e.g., to be mounted on gas cylinders.

BACKGROUND

It is common to mount a regulator on a gas cylinder, designed for reducing the gas pressure in the cylinder of up to about 200 bar to a much lower pressure, e.g., of a few bar, for use by an end-user facility. Such a regulator houses in its body a pressure reducer providing a shut-off device and a movable assembly that is operatively connected to the shut-off device and that delimits with the body a regulating chamber downstream of the shut-off device. Any pressure variation in the regulating chamber directly influences the position of the movable assembly and thereby the opening degree of the shut-off device for compensating the pressure variation.

It is also common for a regulator mounted on a gas cylinder to be provided with a pressure relief device fluidly and operatively connected to the inlet pressure, i.e., the pressure in the gas cylinder, for avoiding the pressure inside the gas cylinder to exceed a predetermined level. The presence of such a pressure relief device is greatly dependent on the type of gas that is stored in the gas cylinder and of the application, i.e., the neighbouring conditions.

Prior art patent document published US 2019/0277496 A1 discloses a gas regulator, primarily for suppling furnace burners with fuel gas like natural gas, equipped with a membrane pressure reducer, a pressure relief device fluidly connected to the regulating chamber through the membrane, and a flow limiting valve upstream of the pressure reducer and electrically operable. The purpose of this flow limiting valve is to limit the flow of gas outputted by the regulator when the end-user facility, for instance a furnace burner, shows zero demand of gas. In practice, a solenoid shut-off valve is provided upstream of the furnace burner and downstream of a burner regulator. When that solenoid shut-off valve is closed, a parallel command signal is supplied to the flow limiting valve so as to reduce the amount of gas that is fed to the burner regulator. The construction of the regulator according to this teaching is interesting by the security provided to the end-user facility, for instance a furnace burner and its regulator. It however requires a command signal for being operative whereas many end-user facilities do not comprise a shut-off valve that is electrically operated in case of zero gas demand.

Prior art patent document published EP 3 246 781 A1 discloses gas regulator for a hot air de-icing system in a turbojet engine, i.e., for lower pressures. The regulator comprises a movable piston with side apertures cooperating with corresponding apertures in a regulator body and forming a shut-off valve. The piston delimits with the body a regulating chamber that is fed with compressed gas from an external sense line. The latter comprises a flow restriction and a pressure relief device. The flow restriction is for fluidly decoupling the external sense line from the regulating chamber. The pressure relief device acts solely on the external sense line, i.e., not on the outlet of the regulator, meaning that if the piston gets stuck in an open position, the outlet pressure will rise without control.

SUMMARY

The invention has for technical problem to overcome least one of the drawbacks of the above cited prior art. The invention has for technical problem to provide a gas regulator with an increased security, in particular with regard to the outlet pressure, while remaining of a simple and reliable construction.

The invention is directed to a regulator for compressed gas, comprising: a body with a gas inlet, a gas outlet and a gas passage fluidly interconnecting the gas inlet and gas outlet, a pressure reducer with, in the gas passage, a shut-off device and a movable member operatively connected to the shut-off device and delimiting with the body a regulating chamber downstream of the shut-off device; a pressure relief device in the gas passage downstream of the regulating chamber; wherein the regulator further comprises: a flow restriction in the gas passage upstream of the shut-off device, dimensioned for reducing the gas pressure at the gas outlet under a maximum pressure value when the pressure relief device is opened and the shut-off device is opened.

The flow restriction is fixed and shows a constant cross-section.

Advantageously, a ration of the cross-section of the pressure relief device in the opened state and of the cross-section of the flow restriction is of at least 5, in various instances at least 10.

According to an exemplary embodiment, the pressure reducer is configured for reducing the pressure at the gas outlet to a reduced pressure value and the maximum pressure value is equal or less then the reduced pressure value.

According to an exemplary embodiment, the pressure relief device comprises a burst disk that bursts and fully opens when the pressure at the gas outlet exceeds a pressure relief value.

According to an exemplary embodiment, the pressure relief value is greater than the reduced pressure value and the maximum pressure value.

According to an exemplary embodiment, the regulator further comprises a non-return valve arranged fluidly downstream of the pressure relief device. The non-return valve is arranged for allowing a gas flow from the pressure relief device to the ambient via the non-return valve.

According to an exemplary embodiment, the flow restriction is formed by a nozzle mounted on the body in the gas passage.

According to an exemplary embodiment, the nozzle is an elongate cylindrical element with, on an upstream side, a calibrated through-hole and, on a downstream side, a larger cavity configured for rotatably engaging with a tightening tool.

According to an exemplary embodiment, the body shows a through-hole forming a portion of the gas passage, the nozzle being screwed into the through-hole.

According to an exemplary embodiment, the through-hole opens out downstream into a bore housing the shut-off device of the pressure reducer, the shut-off device comprising a closing member comprised of a poppet located in the through-hole and a stem extending from the poppet out of the through-hole into the bore, and a ring-shaped seat mounted adjacent the through-hole and cooperating with the poppet.

According to an exemplary embodiment, the regulator further comprises a filter element arranged directly upstream of the restrictor.

According to an exemplary embodiment, the filter element is located in the through-hole retained, on an upstream side, by a shoulder of the through-hole and, on a downstream side, by the nozzle.

According to an exemplary embodiment, the filter element is made of a porous rigid material forming a cylindrical wall with an upstream open end and a downstream end closed by a radial wall of the porous rigid material.

According to an exemplary embodiment, the burst disk shows a periphery that is pinched between a shoulder formed in the body and a circular front face of a vent connector that is screwed into the body.

According to an exemplary embodiment, a cavity is provided on a downstream side of the burst disk, with a diameter that is at least 40%, in various instances at least 50% of a diameter of the burst disk at the periphery thereof.

According to an exemplary embodiment, the vent connector houses the non-return valve.

The invention is particularly interesting in that it provides a reliable security that the pressure at the gas outlet will not exceed a maximum pressure value, even if the pressure reducer is blocked in a fully opened position. This is the result of an adequate matching between the flow restriction and the pressure relief device, taking the gas passage between these two into account. This solution is highly reliable in that it involves no moving parts and no electric command.

The regulator according to the invention can be set up so that the maximum pressure value at the gas outlet, when the pressure relief device is opened and the shut-off device is opened, is comprised between 250 and 350 bar when the pressure at the gas inlet is comprised between 550 and 650 bar.

DRAWINGS

DETAILED DESCRIPTION

Figure 1:
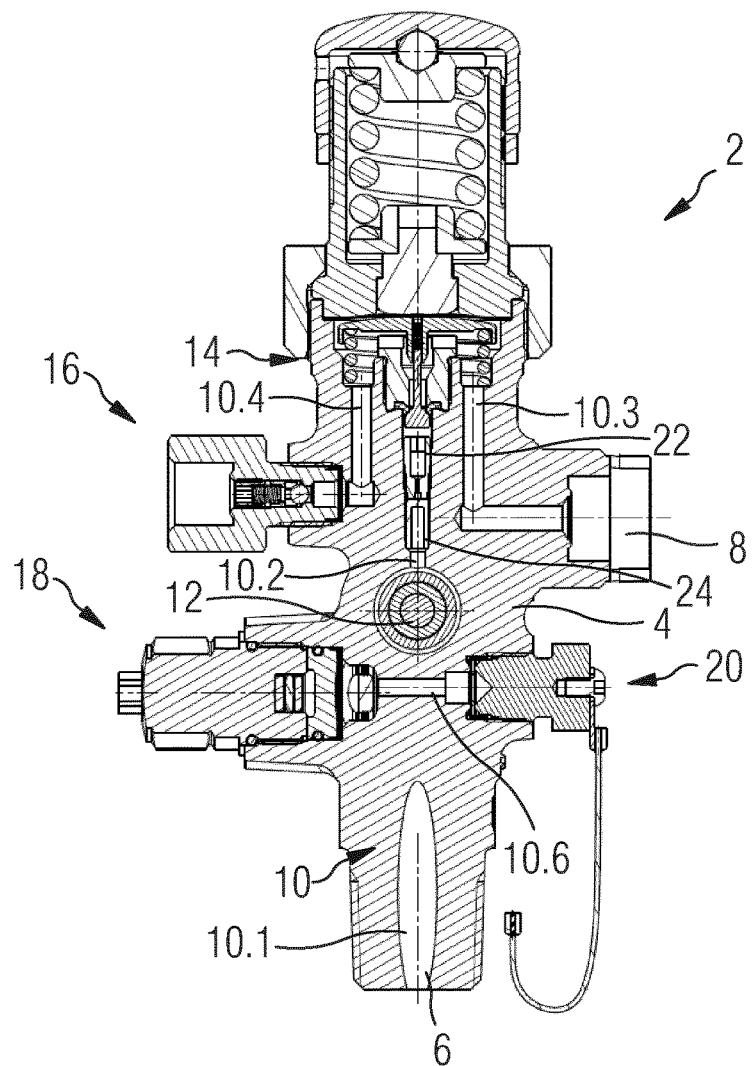
FIG. 1 is an exemplary cross-section view of regulator according to various embodiments of the invention.

FIG. 1 is a longitudinal sectional view of a regulator according to the invention.

The regulator 2 comprises a body 4 with a gas inlet, a gas outlet 8 and a gas passage 10 fluidly interconnecting the gas inlet and gas outlet. The gas passage 10 comprises a first section 10.1 from the gas inlet 6 to a shut-off valve 12, a second section 10.2 from the shut-off valve 12 to a pressure reducer 14, a third section 10.3 from the pressure reducer 14 to the gas outlet 8. The gas passage 10 comprises also a fourth section 10.4, parallel to the third section 10.3, from the pressure reducer to a pressure relief device 16. The gas passage 10 comprises also a fifth section that is not visible, between the first section 10.1, close to the shut-off valve 12, and a refill valve 18, and a sixth section 10.6 between the refill valve 18 and a refill port 20 closed by a removable refill plug.

The shut-off valve 12 is only partly visible in FIG. 1. It comprises a ring-shaped seat formed in the body 4 and a circular valve closing member provided with a ring-shaped seal contacting the seat. These circular and ring-shaped elements are visible in the sectional view in FIG. 1. The shut-off valve 12 comprises also an actuating mechanism (not visible) for moving the closing member between an opening position and a closing position of the gas passage, and vice versa.

In the section portion 10.2 of the gas passage 10, between the shut-off valve 12 and the pressure reducer 14, a flow restriction 22 is provided, and optionally a filter 24 directly upstream of the flow restriction is also provided. The flow restriction 22 forms a passage of a reduced and calibrated cross-section for the gas. The reduced and calibrated cross-section is dimensioned for, in case the pressure reducer 14 would get stuck in an open position and the pressure relief valve 16 would then open, thereby allowing a certain vent flow of gas to the atmosphere, limiting the pressure of the gas directly downstream, i.e., at the gas outlet 8. In normal operation, i.e., when the pressure relief device 16 is not opened and the pressure reducer 14 functions properly, the flow of gas substantially is lower than in case of pressure reducer failure and overpressure as described here above, meaning that the pressure loss caused by the flow restriction become negligible.

Figure 2:
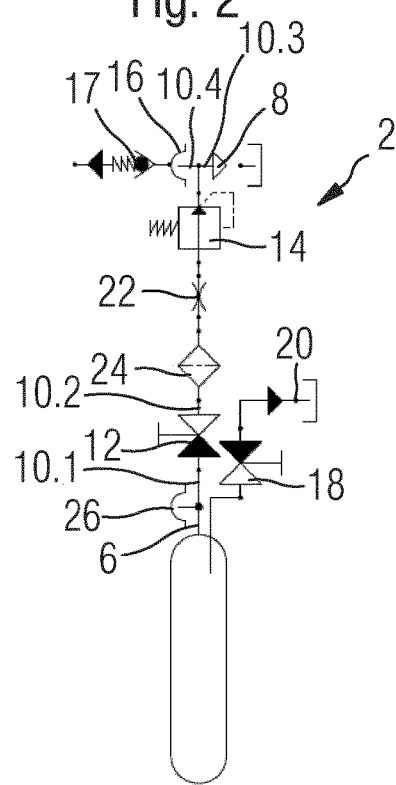
FIG. 2 is an exemplary schematic lay-out representation of the regulator of FIG. 1, according to various embodiments of the invention.

FIG. 2 is a lay-out representation of the regulator of FIG. 1, using commonly used hydraulic symbols.

It can be observed from the gas inlet 6 to the gas inlet 8, the shut-off valve 12, the filter 24, the flow restriction 22 and the pressure reducer 14. It can also be observed that a pressure relief valve 26 is provided and fluidly connected to the gas passage portion between the gas inlet 6 and the shut-off valve 12, i.e., being subjected to the inlet pressure, i.e., the pressure in the gas cylinder and protecting the gas cylinder from overpressure (e.g., in case of temperature increase due to fire). It can also be observed that the pressure relief device 16 fluidly connected to the fourth section 10.4 of the gas passage 10 is followed by a non-return valve 17 directly downstream of the pressure relief valve.

Figure 3:
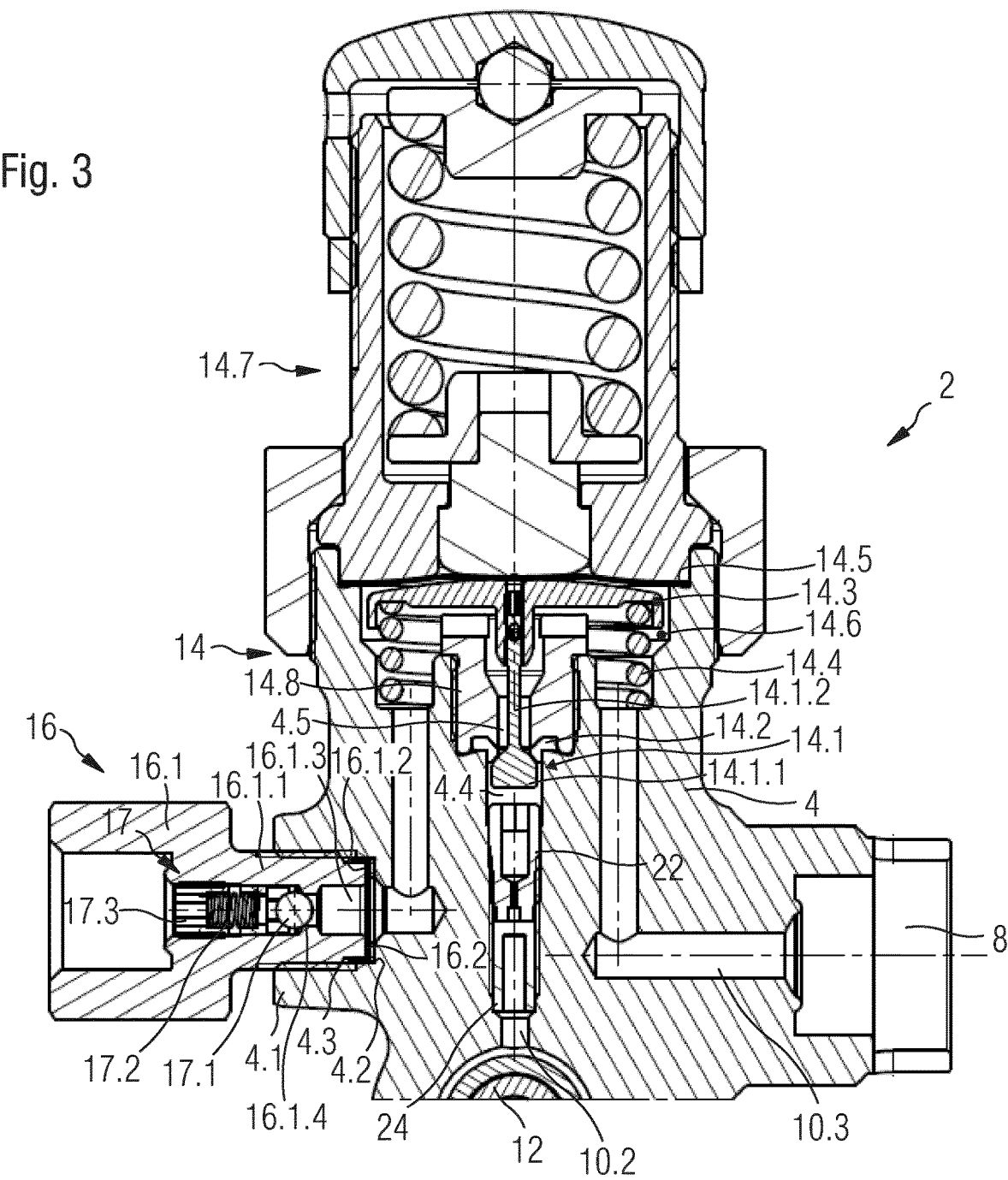
FIG. 3 is an exemplary magnified view of the upper part of the regulator view in FIG. 1, according to various embodiments of the invention.

FIG. 3 is a magnified view of the upper part of the regulator in FIG. 1.

It can be observed that the pressure relief device 16 comprises a connector 16.1 showing a threaded end portion 16.1.1 engaging with a corresponding thread 4.3 in port 4.1 formed in the body 4. The threaded end portion 16.1.1 comprises a front annular face 16.1.2 that pinches the periphery of a burst disk 16.2 against a shoulder 4.2 formed in the port 4.1 of the body 4. The threaded end portion 16.1.1 shows a cavity 16.1.3 directly downstream of the burst disk 16.2 in order to form a venting passage of the gas and also provide enough space for the disk to deform and burst when the pressure at the gas outlet 8 reaches a predetermined maximum pressure value. That cavity shows an inner diameter that is at least 40%, in various instances 50% of the diameter of the burst disk 16.2, i.e., taken at its periphery. The connector 16.1 comprises a longitudinal venting passage that extends from the cavity 16.1.3 to an exit. A seat 16.1.4 is formed in the passage of the connector 16.1, against which a ball 17.1 is urged by a spring 17.2 held by a retainer 17.3, for instance formed as a screw threadably engaging with the passage. The ball 17.1 with the spring 17.2 and the retainer 17.3, together with the seat 16.1.4 form the non-return valve 17 illustrated in FIG. 2 and briefly mentioned above in connection with that figure.

Further in FIG. 3, it can also be observed that the pressure reducer 14 comprises a shut-off device 14.1/14.2 consisting essentially of a closing member 14.1 and a seat 14.2, and a movable assembly 14.3-14.5 operatively connected to the shut-off device, for instance the closing member 14.1. The movable assembly comprises a movable element 14.3 urged by a spring 14.4, and a flexible membrane 14.5 contacted by the movable element 14.3. The flexible membrane 14.5 delimits with the body 4 a regulating chamber 14.6 that is in the gas passage formed in the body, downstream of the shut-off device 14.1/14.2. The closing member 14.1 comprises a poppet 14.1.1 that contacts the seat 14.2 on an upstream side thereof. The closing member 14.1 comprises also a stem 14.1.2 extending downstream from the poppet 14.1.1 through the seat 14.2 to the movable member 14.3. The stem 14.1.2 shows a distal end that is attached, in various instances in a rigid fashion, to the movable member 14.3. The pressure reducer 14 comprises also a pre-setting device 14.7 that exerts a resilient counter-force on the flexible membrane 14.5 for opening the shut-off device 14.1/14.2 and adjusting the pressure in the regulating chamber 14.6 and thereby the reduced pressure at the gas outlet 8. The pre-setting device 14.7 comprises essentially a pusher contacting the flexible membrane 14.5, a spring acting at one end on the pusher and an adjustable thrust at the opposed end of the spring. The adjustable thrust is for instance manually operated. Once properly operated, the pre-setting device 14.7 exerts a counter-force on the flexible membrane 14.5 that is directly transmitted to the movable member 14.3 urged towards the flexible membrane by the spring 14.4. The counter-force counter balances the resilient force of the spring 14.4 and moves the movable member 14.3 towards the shut-off device 14.1/14.2, thereby moving the poppet 14.1.1 away from the seat 14.2 and allowing the gas to flow into the regulating chamber 14.6 and to the gas outlet 8 at a reduced pressure. The functioning principle of the pressure reducer 14 is as such well known and does not need to be further detailed.

Still in FIG. 3, the mounting of the flow restriction 22, the filter 24 and the shut-off device 14.1/14.2 of the pressure reducer 14 is herewith described. The second portion 10.2 of the gas passage 10 (FIG. 1) is formed by a through-hole 4.4 formed in the body 4. The through-hole 4.4 opens out downstream into a bore 4.5 formed in the body 4 and housing the shut-off device 14.1/14.2 of the pressure reducer 14. The filter 24 is inserted from the bore 4.5 into the through-hole 4.4 and the flow restriction 22 is thereafter inserted in the through-hole 4.4 and secured thereto by screwing. The bore 4.5 forms a shoulder adjacent the end of the through-hole 4.4 opening outs into the bore 4.5. The seat 14.2 of the shut-off device 14.1/14.2 is ring-shaped with a first portion that engages into the through-hole 4.4 and a second portion that bears on the shoulder. The seat 14.2 is secured in that position by a screw 14.8 that is threadably secured with the bore 4.5 and shows a front face pressing the seat 14.2 against the shoulder. The screw 14.8 shows a central longitudinal cavity through which the stem 14.1.2 of the closing element 14.1 extends. The body 4 shows a larger bore surrounding the bore 4.5 receiving the screw 14.8 and receiving the spring 14.4.

Figure 4:
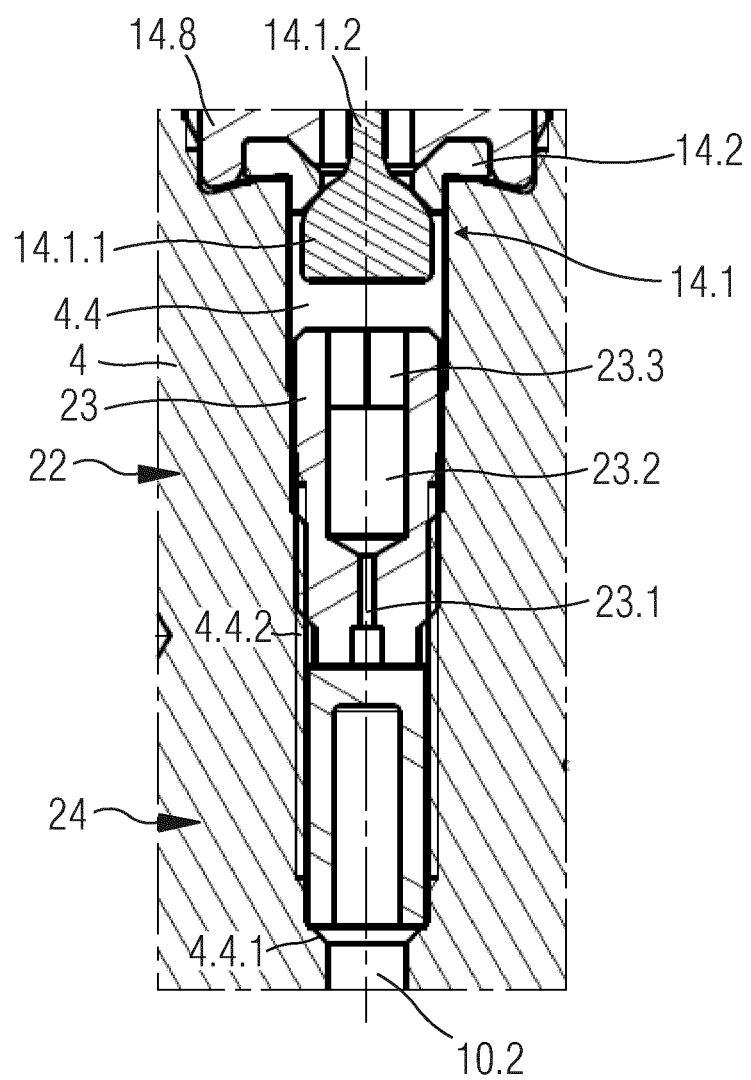
FIG. 4 is an exemplary magnified view of the restrictor and filter of the regulator view in FIGS. 1 and 3, according to various embodiments of the invention.

FIG. 4 is a magnified view of the restrictor and filter of the regulator view in FIGS. 1 and 3.

The filter element 24 is made of a porous rigid material forming a cylindrical wall with an upstream open end and a downstream end closed by a radial wall of the porous rigid material. The through-bore 4.4 formed in the body 4 shows at a distal end a shoulder 4.4.1 onto which the filter element 24 is abutting. The through-bore 4.4 formed in the body 4 shows also an inner thread 4.4.2 that engages with an outer thread formed on the flow restriction 22.

More specifically, the flow restriction 22 is a nozzle 23 forming an elongate cylindrical element with, on an upstream side, a calibrated through-hole 23.1 and, on a downstream side, a larger cavity 23.2 with a non-circular annular surface 23.3 configured for rotatably engaging with a tightening tool.

The above construction of the flow restriction 22 is particularly stable and robust as for being able to support the potentially large forces exerted by the gas at the gas inlet 8, in particular when the shut-off device 14.1/14.2 of the pressure reducer is blocked in an open position and the pressure relief device 16 (FIGS. 1 to 3) is opened so that a large flow of gas is flowing. In that situation, the pressure on the downstream side of the restriction is substantially lower than the pressure on the upstream side. The pressure difference between the upstream and downstream sides results in a force tending to push the nozzle forming the flow restriction 22 out of the through-hole 4.4. The cylindrical elongated shape of the nozzle provides a sufficient length for the thread, i.e., a sufficient number of turns, for properly supporting the resulting pushing effort while limiting this effort by showing a reduced cross-section.

With reference to FIGS. 1 and 3, in operation, before supplying gas to an end-user facility, the pressure reducer 14 is pre-set to a given outlet pressure, leading to opening the shut-off device 14.1/14.2 thereof. Upon actuation of the shut-off valve 12, gas flows from the gas inlet 6 to the gas outlet 8 via the pressure reducer 14 and the regulating chamber 14.6. The pressure reducer 14 ensures that the pressure at the gas outlet 8 remains within a given range of reduced pressure independent of the inlet pressure, until of course the inlet pressure drops down below that range of reduced pressure. If, for any reasons, the pressure reducer 14 would not work properly, leading to an increase of the pressure at the gas outlet 8 above the range of reduced pressure and up to the threshold level of the pressure relief device 16, the latter will open, for instance the burst disk will rupture, leading to a substantially vent flow of gas. This higher vent flow of gas will generate at the flow restriction 22 a substantial pressure loss so that the pressure at the gas outlet 8 will not exceed a given maximum pressure.

The pressure relief device 16 and the flow restriction 22 are designed for, once the pressure relief device is fully opened while the shut-off device of the pressure reducer is blocked in a fully opened position, allow a vent flow of gas that will generate through the flow restriction 22 a pressure loss sufficient for the pressure at the gas outlet 8 not to exceed a maximum pressure value. If the shut-off device of the pressure reducer is blocked in a partly opened position such that the vent flow of gas is lower compared to a situation where the shut-off device is fully opened, the resulting pressure loss at the flow restriction 22 will be lower, meaning that the pressure directly downstream of the flow restriction 22 will be higher than the maximum pressure value. In that case however the only partly opened shut-off device will generate a second pressure reduction, similarly to the flow restriction 22, leading then to a pressure at the gas outlet not exceeding the maximum pressure value.

As a matter of example, for a maximum pressure at gas inlet of about 600 bar, the maximum pressure value can be set to about 300 bar. The reduced pressure value of the pressure reducer can be also of about 300 bar. When considering in FIG. 3 the design of the pressure reducer 14, in particular the pre-setting device 14.7, it is apparent that the pressure reducer is in this specific example is specifically designed for outputting a rather high reduced pressure, for instance of about 300 bar.

The cross-section of the flow restriction cannot be defined or limited with absolute values, for it depends greatly on the maximum pressure value not to exceed and on the vent flow of gas once the pressure relief device is opened. That vent flow of gas depends not only on the pressure relief device but also on the gas passage between the flow restriction and the pressure relief device.

What is claimed is:

1. A regulator for compressed gas, said regulator comprising:
   a body with a gas inlet, a gas outlet and a gas passage fluidly interconnecting the gas inlet and gas outlet;
   a pressure reducer with, in the gas passage, a shut-off device and a movable assembly operatively connected to the shut-off device and delimiting with the body a regulating chamber downstream of the shut-off device;
   a pressure relief device in the gas passage downstream of the regulating chamber; and
   a flow restriction in the gas passage upstream of the shut-off device, dimensioned for reducing the gas pressure at the gas outlet under a maximum pressure value when the pressure relief device is opened and the shut-off device is opened.

2. The regulator according to claim 1, wherein the pressure reducer is configured for reducing the pressure at the gas outlet to a reduced pressure value, and the maximum pressure value is equal or less then the reduced pressure value.

3. The regulator according to claim 1, wherein the pressure relief device comprises a burst disk that bursts and fully opens when the pressure at the gas outlet exceeds a pressure relief value.

4. The regulator according to claim 3, wherein the pressure reducer is configured for reducing the pressure at the gas outlet to a reduced pressure value, and the maximum pressure value is equal or less then the reduced pressure value; and wherein the pressure relief value is greater than the reduced pressure value and the maximum pressure value.

5. The regulator according to claim 1, further comprising a non-return valve arranged fluidly downstream of the pressure relief device.

6. The regulator according to claim 1, wherein the flow restriction is formed by a nozzle mounted on the body in the gas passage.

7. The regulator according to claim 6, wherein the nozzle is an elongate cylindrical element with, on an upstream side, a calibrated through-hole and, on a downstream side, a larger cavity configured for rotatably engaging with a tightening tool.

8. The regulator according to claim 7, wherein the body shows a through-hole forming a portion of the gas passage, the nozzle being screwed into the through-hole.

9. The regulator according to claim 8, wherein the through-hole opens out downstream into a bore housing the shut-off device of the pressure reducer, the shut-off device comprising a closing member comprised of a poppet located in the through-hole and a stem extending from the poppet out of the through-hole into the bore, and a ring-shaped seat mounted adjacent the through-hole and cooperating with the poppet.

10. The regulator according to claim 1, further comprising a filter element arranged directly upstream of the flow restriction.

11. The regulator according to claim 10, wherein the filter element is located in a through-hole of the body and retained, on an upstream side, by a shoulder of the through-hole and, on a downstream side, by a nozzle formed by the flow restriction.

12. The regulator according to claim 10, wherein the filter element is made of a porous rigid material forming a cylindrical wall with an upstream open end and a downstream end closed by a radial wall of the porous rigid material.

13. The regulator according to claim 3, wherein the burst disk shows a periphery that is pinched between a shoulder formed in the body and a circular front face of a connector that is screwed into the body.

14. The regulator according to claim 13, wherein a cavity is provided on a downstream side of the burst disk, with a diameter that is at least 40% of a diameter of the burst disk at the periphery thereof.

15. The regulator according to claim 13, wherein the connector houses a non-return valve arranged fluidly downstream of the pressure relief device.

* * * * *